July 26, 1966

J. H. McAULEY ETAL 3,262,548

FLEXIBLE CHAIN WITH BEARING SURFACES

Filed July 19, 1965

INVENTORS
JAMES H. McAULEY &
THOMAS G. RAUCH
BY MAHONEY, MILLER & RAMBO
BY
ATTORNEYS

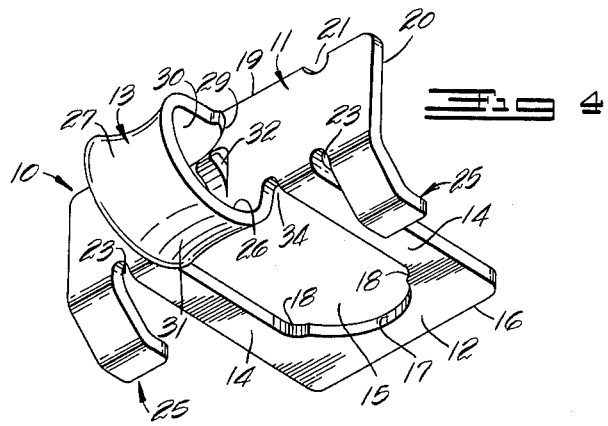
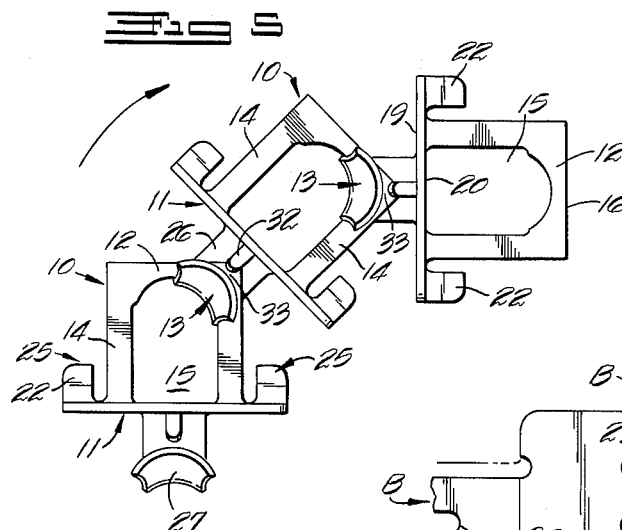
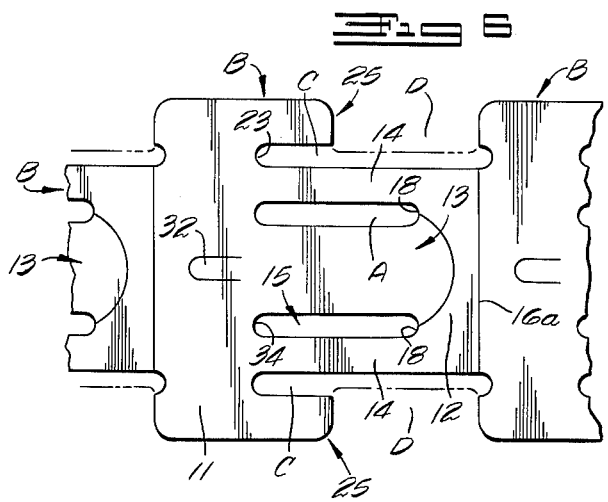

July 26, 1966  J. H. McAULEY ETAL  3,262,548
FLEXIBLE CHAIN WITH BEARING SURFACES
Filed July 19, 1965  3 Sheets-Sheet 3
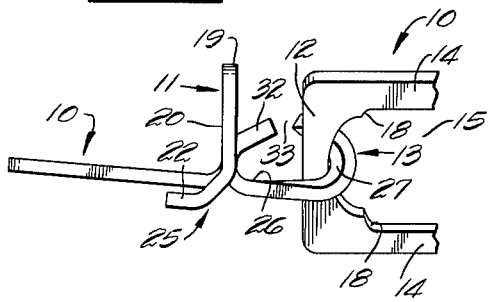
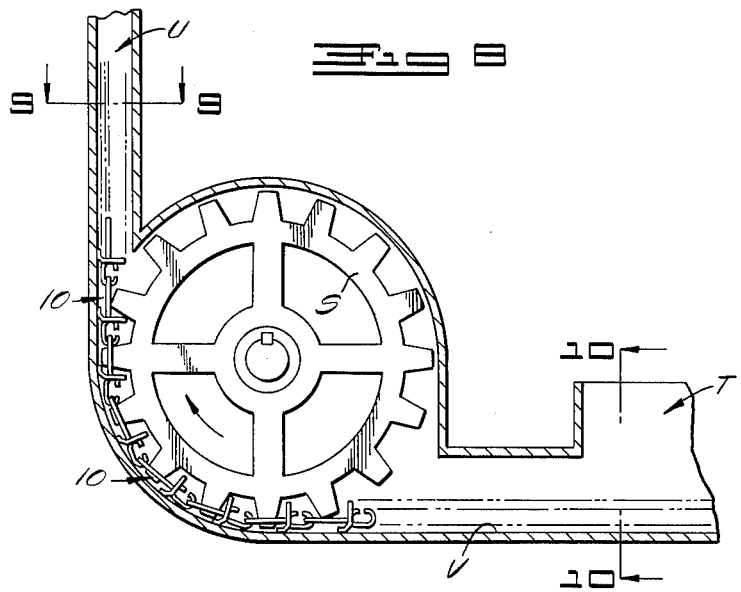
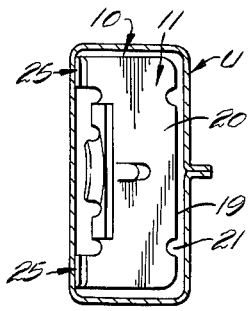
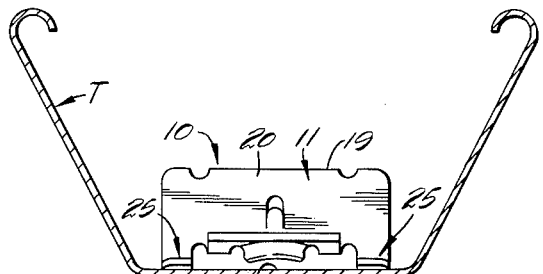
INVENTORS
JAMES H. McAULEY &
THOMAS G. RAUCH
BY MAHONEY, MILLER & RAMBO
BY Wm. V. Miller
ATTORNEYS United States Patent Office 3,262,548
Patented July 26, 1966

3,262,548
FLEXIBLE CHAIN WITH BEARING SURFACES
James H. McAuley, Bremen, and Thomas G. Rauch, Lancaster, Ohio, assignors to McAuley Manufacturing, Inc., Bremen, Ohio, a corporation of Ohio
Filed July 19, 1965, Ser. No. 473,022
5 Claims. (Cl. 198—173)

This invention relates to a material-moving flexible chain. It has to do, more specifically, with a chain which is particularly suitable for moving loose granular material, such as animal or poultry feed, along a feed conduit which has components extending in both horizontal and vertical directions. The chain can also handle, in a conduit or trough, bulky feed or roughage material and can even handle aggregate, sand, etc. This chain is of the general type disclosed in the patent to Graetz et al. No. 2,672,059, issued March 16, 1954, and the patent to McAuley No. 2,889,915, issued June 9, 1959, but embodies important improvements in structure not disclosured in those patents.

The chain embodying the present invention is composed of interlocking or interfitting links. The construction of the individual links is such that when a plurality of them are hooked together, the resulting chain has the desired degree of flexibility. The chain is especially designed for traveling along an open conduit, such as a trough, having a flat bottom, or through a closed conduit or tube of rectangular cross-section. It is sufficiently flexible that it can travel along horizontal and vertical runs of the conduit, or any angle therebetween. The improvements in the present chain are mainly in the structure of each of the links in order to greatly increase its material-carrying capacity while still maintaining a plowing effect through the material so as not to tend to pack the material in the conduit and in order to prevent wear on the pintle portion and the pintle-receiving and sprocket-engaging barrel portion of each link.

The chain of this invention is formed of links made as simple economical stampings with a minimum waste of material, which can be produced and simultaneously assembled in a low-cost process into any desired chain lengths. Also, although there is no danger of accidental disconnection of links during usage, the links can be disassembled with ease when it is desired to do so.

The accompanying drawings illustrate links and a chain embodying the present invention, a blank from which the links can be made, and an example of how the chain can be used.

In these drawings:

FIGURE 4 is a perspective view of one of the links.

FIGURE 5 is a plan view similar to FIGURE 1 but illustrating how the chain can flex in the main plane of the links.

FIGURE 6 is a schematic plan view illustrating a blank from which the chain links can be made.

FIGURE 7 is an edge elevational view of connected links of the chain illustrating how one link may twist relative to the next.

FIGURE 8 is a vertical sectional schematic view illustrating an installation in which the chain of this invention includes both horizontal and vertical runs.

FIGURE 9 is an enlarged horizontal transverse sectional view taken along line 9—9 of FIGURE 8.

FIGURE 10 is an enlarged vertical transverse sectional view taken along line 10—10 of FIGURE 8.

Figure 1:
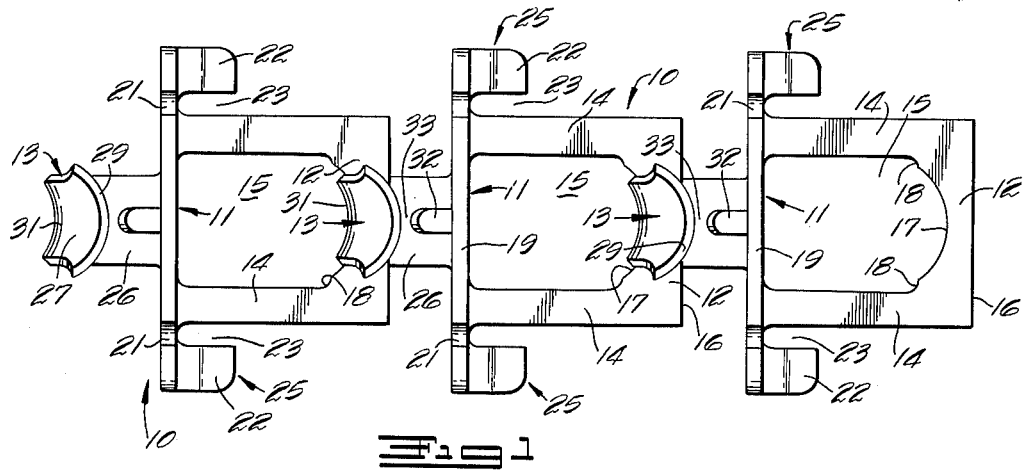
FIGURE 1 is a plan view of interlocked links of a length of chain embodying this invention.

With reference to the drawings, there is illustrated in FIGURES 1-5 a flexible chain composed of the interlocking links 10 which are so connected together that the links may pivot relative to each other at right angles to the plane of travel of the links to facilitate going around a sprocket S from a horizontal to a vertical flight as shown in FIGURE 8, may swing relative to each other in the plane of the links to facilitate changing direction of travel in the plane of the chain as shown in FIGURE 5, or may twist relative to each other about the longitudinal axis of the chain, as shown in FIGURE 7 to facilitate passing over particles that may work under one side of the chain between it and the wall of the trough or conduit. An important feature of my present invention is that each link is provided with a transversely-disposed, material-carrying and pushing or plowing blade or flight 11 which will project outwardly, normally upwardly, from the plane of movement of the chain and also extend transversely thereof, the full width of the chain and beyond without interruption, so as to support and to engage and push material through the conduit in which the chain operates. Usually the chain will operate with the blades or flights 11 extending upwardly.

Each of the links 10 takes the form illustrated in the drawings and preferably is produced by a die-cutting and stamping operation. Each link consists of a substantially flat body which has a flat pintle portion 12 at one end and a hook-shaped barrel portion 13 at the other end which are joined together by the two integral flat connecting side portions 14. The flight or blade 11 extends across the body of the link substantially parallel and opposite to the pintle portion 12 and the barrel portion 13 is formed integral therewith substantially midway of the ends thereof. This arrangement provides a central aperture 15 which will receive a tooth of the driving or supporting sprockets which will be provided for the chain and the barrel portion 13 is located at the rear end of the chain link relative to its intended direction of travel, as indicated in FIGURES 1 and 2.

Figure 2:
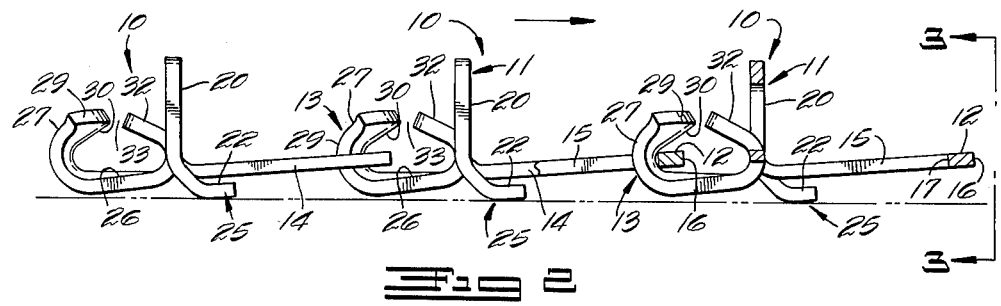
FIGURE 2 is an edge elevational view, partly broken away, of the length of chain shown in FIGURE 1.

The pintle portion 12 is at the forward end of the link relative to its intended direction of travel, as indicated in FIGURES 1 and 2, and is provided with a forward or leading straight transversely disposed edge 16 and a rear or trailing forwardly curved arcuate edge 17. The outer and inner edges of the flat side portions 14 are straight and parallel with each other. Between the curved edge 17 and the straight inner edges of the side portions 14 are the notches 18. The rear ends of the flat connecting side portions 14 are connected integrally to the flight 11, as indicated.

The flight 11 is of special form according to our invention to obtain the best material plowing and carrying action. It is upstanding from the upper side of the body of the link at the rear end thereof and extends transversely completely across the forward end of the body of the link without interruption. It also projects laterally in both directions outwardly substantially beyond the sides of the body of the link, that is beyond the outer edges of the flat side connecting portions 14. The blade or flight 11 is upstanding in a plane substantially perpendicular to the flat common plane of the flat side members 14 of the link so as to present a flat upstanding forward "bulldozing" face or area 20 which will engage and push the material. The upper edge 19 is horizontally disposed and is straight completely across the flight of blade 11 except that it is provided with upwardly opening shallow notches 21 which result from the method used in forming the body of the link from a blank. The laterally projecting ends of the flight or blade 11 are provided with bearing or wear feet 25 which will normally slide along the bottom of the feed trough along which the chain usually moves. These feet are formed as an integral part of the flight or blade 11 and each is in the form of a lug which angles forwardly and downwardly and terminates in a forwardly extending flat foot portion 22 which has a lower flat bearing surface. It will be noted that the flat terminal forward ends of these lugs are in a common transverse plane which is at a right angle to the plane of the upstanding blade or flight 11. It will be noted also (FIGURES 2 and 3) that the plane of the foot portions 22 is lower than and substantially parallel to the plane of the body of the link in which the flat side members 14 and flat pintle portion 12 are commonly disposed. Just inside each foot member 25 is an upwardly opening notch 23 (FIGURES 3 and 4) in the corner between the lug and the lower edge of the blade 11.

The pintle-receiving, hook-shaped barrel portion 13 is formed on the rear end of the body of the link opposite the pintle portion 12 and is located laterally midway between the opposed ends of the blades or flights 11. Each barrel portion is provided with a flat portion 26 that extends rearwardly from the lower edge of the flight or blade 11 and is integral therewith. This portion 26 is of less width than the space 15 (FIGURES 1 and 4) and is connected to the member 11 at a point laterally midway of its ends, or midway between the bearing feet 25, and is at a right angle to the member 11 in the common plane of the body of the link which includes the members 12 and 14. The rear end of the portion 26 is integral with the hook portion 27 which turns upwardly and forwardly toward the associated blade or flight 11 (FIGURES 1 and 2) but terminates short thereof to provide a space therebetween. The hook extremity or leading end is curved, as indicated at 29, and the hook is bodily transversely curved to provide a leading convex pintle engaging bearing surface 30 with a corresponding concave surface 31 at its rear or trailing side. Struck rearwardly from the member 11 is a retaining lug or finger 32 which is bent rearwardly toward the hook extremity 29 but is spaced slightly therefrom to provide the space 33.

Figure 3:
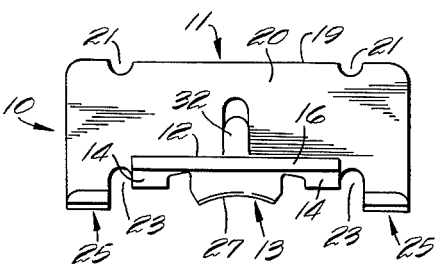
FIGURE 3 is a front elevational view, taken from the position indicated at line 3—3 of FIGURE 2, of one of the chain links embodying this invention.

It will be noted from FIGURES 2, 3 and 4 that the foot members 25 will extend downwardly below the lowermost portion 26 of the barrel portion 13. This space 33 is just slightly less in width than the thickness of the flat pintle portion 12 so that the pintle portion of one link can be turned on edge and forced through the space 33 into the barrel portion 13 of the other link. It will be noted that the barrel portion 13 is of substantially less lateral extent or width than that of the opening 15. Also it will be noted that there are notches 34 between the side portions 14 and the barrel portion 13. As will later appear, the barrel portion 13 is formed from the material removed to produce the opening 15 in the flat body of the link.

The chain links of this invention may be stamped from a strip of metal, such as sheet steel, as indicated diagrammatically in FIGURE 6. This figure shows how flat blanks B may be stamped successively from the strip of metal. The only scrap material will be slugs removed at each side of the barrel-forming tongue at the longitudinal slots A, so that the barrel portion 13 of the link will be of substantially less width than the sprocket-opening 15 thereof, and at the longitudinal slots C and communicating outwardly-opening notches D between the adjacent links at each side of the pintle portion 12. It will be noted that the pintle portion is separated along a straight slit 16a from the next blank. From one of the flat blanks B of FIGURE 6, the link of FIGURE 3 is formed by bending the flight or blank 11 from the flat plane of the blank, by bending the foot members 25 downwardly and rearwardly therefrom, and by bending the hook-shaped barrel portion 13 into proper form.

Any suitable length of chain may be made up by interlocking a suitable number of links. One link can be readily interlocked with the next by positioning one link relative to the other so that the pintle 12 will be on edge relative to the flat bottom portion 26 of the barrel portion 13 of the other link portion and then slipping it through the space 33 of the other into such hook-shaped barrel portion. Similarly by a reverse action, they may be separated. The pintle portions 12 will fit loosely in their associated barrel portions 13 to permit considerable movement of the links relative to each other in all directions.

The chain may be used for various purposes but is particularly useful for carrying feed, such as animal or poultry feed. An example of its use is shown in FIGURES 8–10 where it is shown with a horizontal run and a vertical run and passing around the sprocket S. This sprocket may be of common form and has teeth which enter the openings 15 of successive links. The horizontal run may pass through an open trough T as indicated in FIGURE 10 and the vertical run may pass through a closed trough as indicated at U in FIGURE 9. The chain will carry the feed along the trough T plowing through it, with the flat body of the link, including members 12 and 14, carrying the feed and the upstanding blades or flights 11 pushing it along. The feet 25 will slide along the bottom V of the trough. The chain may be used for loading what are known as bunk bins, which have a larger cross section than it, or it may be used for moving feed along troughs having a cross-sectional area approaching it in size. From the trough, large or small animals or poultry may have access to the feed. The closed vertical conduit U can be of substantially rectangular form just slightly greater than that of the chain so that the cross-sectional area of the conduit or tube will be substantially filled by the flights or blades 11 of the chain links and the feed will, therefore, be more effectively lifted. Also, an open trough of rectangular cross section substantially filled by that of the chain may be used. The chain will be kept taut by sprockets S which carry and drive it, by the teeth thereof engaging against the convex surfaces 30 of the barrel portions 13, and the links will align themselves with each other normally as indicated in FIGURE 1, due to the forward convex bearing surfaces 31 on the links which have a centering effect in cooperation with the curved trailing edges 17 of the pintle portions 12. Lateral movement of one link is permitted readily relative to the other because the barrels 13 are of less lateral extent than the openings 15. The pintle portions 12 can move in the barrels 13 in which they fit loosely in substantially any direction, such as with a lateral sliding movement as just described, with a rocking movement in a plane at an angle to the plane of movement of the chain as in passing around the sprocket in FIGURE 8, with a lateral turning movement as in FIGURE 5 or with a twisting movement as in FIGURE 7. All these movements are desirable in carrying animal or poultry feed or other feed in various installations. The lateral sliding and lateral flexing movement between links will facilitate travel of the chain around horizontal corners (FIGURE 5) where a guide wheel (not shown) may be provided. Relative rocking of the links in the other plane will facilitate passage from horizontal to vertical runs around a sprocket. Vertical movement of the flat pintle 12 in each barrel portion 13 will be permitted so that all the pintles 12 of successive links and the pull on the chain will be in substantially the same plane as indicated in FIGURE 2. Relative twisting as in FIGURE 7 will permit the foot member 25 at one side of a link to ride up over a pebble or the like on the bottom of the trough at one side of the chain without raising the other side of the link. All relative movements will keep the interlocking joints free of accumulations of materials.

As long as the chain is sliding along the bottom V of a trough or conduit, as in FIGURE 10, it will slide along on the bearing feet 25. These feet project downwardly beyond all other portions of the chain, as also indicated in FIGURES 2 and 3, so that the wear will be on these portions rather than on the pintle and barrel portions 12 and 13, respectively, which it is desired to protect from as much wear as possible inasmuch as they are the members subjected to the most stress in the driving of the chain. Material particles which might otherwise wedge underneath the links can usually pass through the space between the laterally spaced bearing feet 25.

Accidental separation of the links of the chain will not occur because, when the chain is taut, the pintle portions 12 will lie substantially flat in the barrel portions 13 and the space 33 will be of less width than the flat pintle portions, due to the provision of the finger 32. However, if it is desired to disconnect links, the pintle portion 12 of one link may be disposed on edge and forced through the space 33 of the adjacent link which is slightly less than the thickness of the pintle portion.

In most installations, the chain will slide along on the feet 25 and the flights or blades 11 will be upright. However, in some special cases, it may be desirable to reverse the chain with the members 11 depending therefrom and sliding along the bottom of the trough. In that case, the barrel portion 13 and pintle portion 12 will still be protected from wear since the members 11 will project downwardly well beyond such portions.

It will be apparent from the above that we have provided a flexible chain which is particularly useful in moving loose-particle material. Many advantages of the chain have been discussed and others will be apparent.

Having thus described this invention, what is claimed is:

1. In a chain composed of interlocking links where each of said links comprises a substantially flat body having a transversely extending pintle portion at its one end, and an outwardly extending hook-shaped pintle-receiving barrel portion at its opposite end; the improvement which comprises a transversely extending, upright material-engaging blade on said body which carries downwardly extending bearing feet for engaging a support surface over which the chain is to be advanced and in which the blades of all of said interlocking links extend upwardly in the same direction from the bodies of the respective interlocking links, said blade of each link being continuous and extending transversely completely across the body and projecting laterally beyond the lateral extent of the body to provide lateral projections, said lateral projections having downwardly extending lugs from said projections to provide said bearing feet which have surfaces to engage said support surface over which the chain is to be moved, said lugs extending downwardly beyond the level of the lowermost extent of said body and said barrel and pintle portions carried thereby to prevent wearing contact thereof with said support surface as the chain advances therealong, said lugs being laterally spaced to provide a transverse space centrally therebetween and beneath said body to permit the rearward passage therethrough of any material beneath said body and on said support surface as the chain advances therealong, and said continuous blade extending upwardly beyond the level of the uppermost extent of said body and said barrel and pintle portions so as to engage and move material along with said body as the chain advances.

2. In a chain composed of interlocking links where each of said links comprises a substantially flat body having a transversely extending pintle portion at its one end, and an outwardly extending hook-shaped pintle-receiving barrel portion at its opposite end; the improvement which comprises a transversely extending, upright material-engaging blade on the said opposite end of said body just inwardly of said barrel portion which carries downwardly extending bearing feet for engaging a support surface over which the chain is to be advanced and in which the blades of all of said interlocking links extend upwardly in the same direction from the bodies of the respective interlocking links, said hook-shaped pintle-receiving barrel portion extending rearwardly from said blade midway laterally thereof, said blade of each link being continuous and extending transversely completely across the body and projecting laterally beyond the lateral extent of the body to provide lateral projections, said lateral projections having downwardly extending lugs from said projections which are turned forwardly to provide said bearing feet with forward extremities that engage the material on said support surface as the chain advances and lower bearing surfaces to engage said support surface, said lugs extending downwardly to a sufficient extent to locate said bearing surfaces below the level of the lowermost extent of said body and said barrel and pintle portions carried thereby to prevent wearing contact thereof with said support surface as the chain advances therealong, said lugs being laterally spaced to provide a transverse space centrally therebetween and beneath said body to permit the passage therethrough of any material beneath said body and on said support surface as the chain advances therealong, and said continuous blade extending upwardly beyond the level of the uppermost extent of said body and said barrel and pintle portions so as to engage and move material along with said body as the chain advances.

3. A chain according to claim 2 in which said blade is upstanding substantially at a right angle to said flat body, and said bearing surfaces are located in a plane substantially parallel to that of said flat body of the link.

4. A chain according to claim 2 in which said barrel portion comprises a hook which extends upwardly and forwardly toward said blade but has an extremity which is spaced therefrom to provide a pintle portion insertion slot at a level above the plane of said flat body.

5. A chain according to claim 4 in which a stop finger formed on said blade extends toward said hook extremity to limit the width of said slot, said pintle portion being flat and having a width and thickness greater than that of the slot to necessitate forcing through the slot in assembling or disassembling interlocking links of the chain.

References Cited by the Examiner
UNITED STATES PATENTS 2,889,915  6/1959  McAuley _____ 198—176
3,215,256  11/1965  McAuley _____ 198—168

EVON C. BLUNK, *Primary Examiner.*

R. S. KRISHER, *Assistant Examiner.*